United States Patent [19]

Miyabayashi et al.

[11] Patent Number: 5,176,969
[45] Date of Patent: Jan. 5, 1993

[54] ELECTRODE FOR SECONDARY BATTERY

[75] Inventors: Mitsutaka Miyabayashi; Manabu Hayashi; Eiki Yasukawa; Kikuko Miyata; Mitsumasa Kaitoh; Hiroshi Yui, all of Yokkaichi, Japan

[73] Assignee: Mitsubishi Petrochemical Co., Ltd., Tokyo, Japan

[21] Appl. No.: 689,523

[22] Filed: Apr. 23, 1991

[51] Int. Cl.⁵ ............................................ H01M 4/60
[52] U.S. Cl. .................................. 429/212; 429/218; 252/518
[58] Field of Search ................ 252/511, 518, 512; 524/495, 496, 401; 429/192, 212, 218

[56] References Cited

U.S. PATENT DOCUMENTS

| | | | |
|---|---|---|---|
| 4,517,265 | 5/1985 | Bélanger et al. | 429/212 |
| 4,725,422 | 2/1988 | Miyabayashi et al. | 423/445 |
| 4,945,014 | 7/1990 | Miyabayashi et al. | 429/218 |
| 4,980,250 | 12/1990 | Miyabayashi et al. | 429/218 |

FOREIGN PATENT DOCUMENTS

| | | |
|---|---|---|
| 098772 | 1/1984 | European Pat. Off. |
| 293946 | 12/1988 | European Pat. Off. |
| 328131 | 8/1989 | European Pat. Off. |
| 404578 | 12/1990 | European Pat. Off. |
| 409192 | 1/1991 | European Pat. Off. |

OTHER PUBLICATIONS

Patent Abstracts of Japan vol. 12, No. 474 (E-692) (3321) Dec. 12, 1988 & JP-A-63 193 463 (Toshiba Battery Co. Ltd.) Aug. 10, 1988 *Abstract*.

Primary Examiner—Mark L. Bell
Assistant Examiner—Deborah Jones
Attorney, Agent, or Firm—Oblon, Spivak, McClelland, Maier & Neustadt

[57] ABSTRACT

Disclosed is an electrode for secondary battery, which comprises lithium or an alkali metal composed mainly of lithium doped as the active substance in a carrier composed of a mixture of a carbonaceous material satisfying the following conditions (A) and an organic polymer having ion conductivity of lithium.

(A) a carbonaceous material with a hydrogen/carbon (H/C) atomic ratio of less than 0.15, a spacing ($d_{002}$) of the (002) plane according to the X-ray wide angle diffraction method of 3.37 to 3.75 Å and a crystallite size in the c-axis direction (Lc) of 5 Å or more.

12 Claims, 1 Drawing Sheet

ELECTRODE FOR SECONDARY BATTERY

BACKGROUND OF THE INVENTION

This invention relates to an electrode for secondary battery having high capacity and excellent in charging and discharging characteristics. More specifically, it relates to an electrode for secondary battery which can constitute a cylindrical secondary battery as a flexible and coil-shaped electrode or a sheet-shaped secondary battery as a thin sheet-shaped electrode, particularly an electrode for lithium secondary battery of which the active substance is lithium or an alkali metal composed mainly of lithium.

Electroconductive polymers such as polyacetylene have been proposed as the electrode for secondary lithium batteries.

However, electroconductive polymers cannot be doped with large amounts of lithium ions and also exhibit insufficient polyacetylene.

However, an electroconductive polymer cannot be doped lithium ions with a large amount and is insufficient in electrode capacity and stable charging and discharging characteristics.

Also, an attempt has been made to use lithium metal as the negative electrode of secondary lithium battery, but in this case, the charging the discharging cycle characteristics are not so good. More specifically, during discharging of the battery, lithium moves as lithium ions from the negative electrode body into an electrolyte, while during charging the lithium ions are again electrodeposited as metallic lithium onto the negative electrode. By repeating this charging and discharging cycle, the metallic lithium electrodeposited in these cycles cycle becomes shaped into dendrites. Since the dendrite-shaped lithium is a which results in deterioration of the charging thereby causing an inconvenience to occur that the charging and discharging cycle characteristics of the battery. Further, when this grows until the dendrite-shaped metallic lithium electrodeposited product reaches the positive electrode through the separator, the battery is then short-circuited. That is, the charging and discharging cycle life is short.

To avoid such problems, it has been attempted to use a carbonaceous material of a sintered organic compound as the negative electrode and to carry lithium or an alkali metal composed mainly of lithium thereon.

By this technique, the charging and discharging characteristics of the negative electrode can be dramatically improved, but on the other hand, an electrode molding material which uses this carbonaceous material has poor flexibility, and no satisfactory electrode shaped into a sheet or coil can be obtained.

Also, an electrode in which with use of the carbonaceous material, a large amount of an insulating material such as polyethylene as a binder is used, is excellent in flexibility but electric resistance becomes markedly large so that electrode capacity and output are lowered remarkably.

SUMMARY OF THE INVENTION

An object of the present invention is, under the state of the art as described above, to provide a negative electrode for a secondary lithium battery having large electrode capacity, excellent charging and discharging cycle characteristics, and also good flexibility.

The present inventors have studied intensively about the negative electrode in order to solve the problems as described above, and consequently found that an electrode having lithium as an active substance carried on a carrier comprising a mixture of a carbonaceous material as described below and an alkali metal ion conductive polymer composition is very effective in achieving the above object.

More specifically, the present invention is an electrode for secondary battery, comprising lithium or an alkali metal composed mainly of lithium doped as the active substance in a carrier composed of a mixture of a carbonaceous material satisfying the following conditions (A) and a conductive polymer composition composed of lithium or an alkali metal ion composed mainly of lithium and a polymer having ion conductivity of lithium.

(A) a carbonaceous material with a hydrogen/carbon (H/C) atomic ratio of less than 0.15, a spacing ($d_{002}$) of the (002) plane according to the X-ray wide angle diffraction method of 3.37 to 3.75 Å and a crystallite size in the c-axis direction (Lc) of 5 Å or more.

DESCRIPTION OF THE PREFERRED EMBODIMENTS

Figure 1:
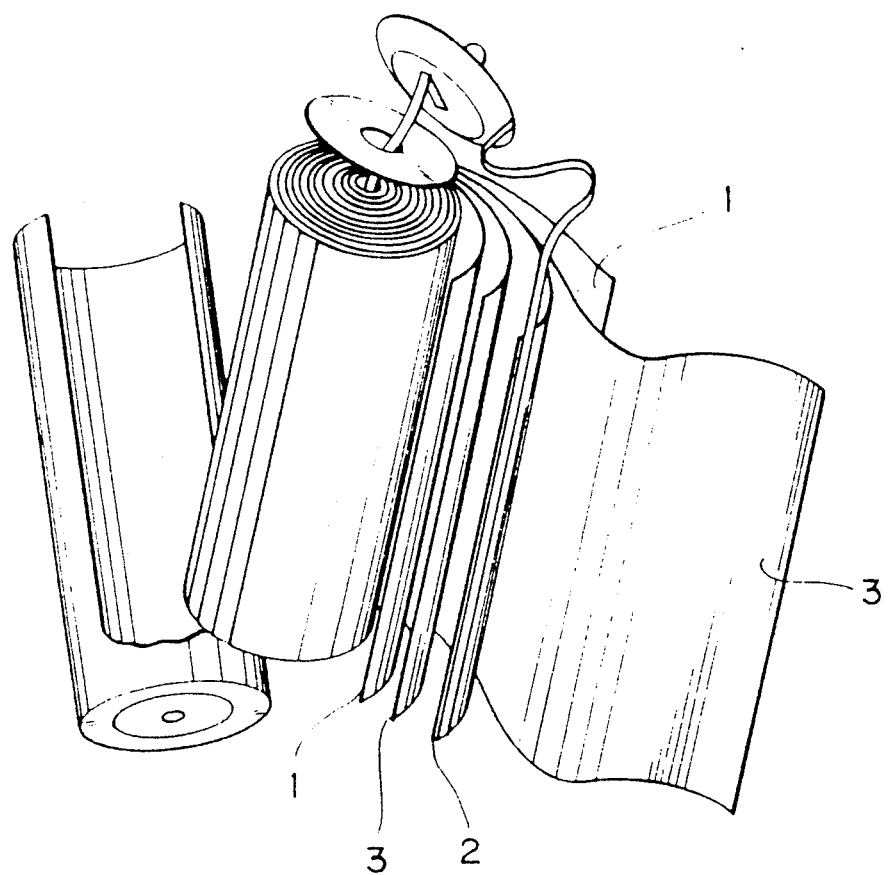
FIG. 1 is an illustration showing the constitution of the battery in Example 1, in which 1 shows a positive electrode, 2 shows a negative electrode and 3 shows a separator (including electrolyte).

The carbonaceous material has the following characteristics:

(1) the atomic ratio of hydrogen/carbon (H/C) is less than 0.15; and (2) the spacing ($d_{002}$) of the (002) plane according to the X-ray wide angle diffraction method is 3.37 to 3.75 Å and the crystallite size in the c-axis direction (Lc) is 5 Å or more.

In the carbonaceous material, other atoms such as nitrogen, oxygen and halogen may be also present at a ratio preferably of 7 mole % or less, more preferably 4 mole % or less, particularly preferably 2 mole % or less.

H/C is preferably less than 0.10, more preferably less than 0.07, and particularly preferably less than 0.05.

The spacing ($d_{002}$) of the (002) plane is preferably 3.39 to 3.75 Å, more preferably 3.41 to 3.70 Å, particularly preferably 3.45 to 3.70 Å, and the crystallite size in the c-axis direction Lc is preferably 5 to 220 Å, more preferably 5 to 150 Å, further preferably 10 to 80 Å, and particularly preferably 12 to 70 Å.

When either one of these parameters, namely H/C, $d_{002}$ and Lc falls out of the above-specified ranges, the overvoltage during charging and discharging in the electrode becomes greater, whereby not only a gas is generated from the electrode which markedly impairs the safety of the electrode, but also the charging and discharging cycle characteristics are adversely affected.

Further, the carbonaceous material to be used for the electrode of the present invention preferably has the characteristics described below.

That is, in the Raman spectrum analysis by use of an argon ion laser beam with a wavelength of 5145 Å, the G value as defined by the following formula $$G = \frac{\text{Integrated value of spectrum intensity in the wave number region of } 1580 \pm 100 \text{ cm}^{-1}}{\text{Integrated value of spectrum intensity in the wave number region of } 1360 \pm 100 \text{ cm}^{-1}}$$

is preferably less than 2.5, more preferably less than 2.0, particularly from 0.2 to less than 1.2.

Here, G value refers to the integrated value (area intensity) of the spectrum intensity within the range of the wave number $1580 \pm 100$ cm$^{-1}$ divided by the area intensity within the range of the wave number $1360 \pm 100$ cm$^{-1}$ in the spectrum intensity curve recorded on the chart when Raman spectrum analysis is performed by use of an argon ion laser beam of a wavelength of 5145 Å for the above-mentioned carbonaceous material, and corresponds to a measure of the graphitization degree of the carbonaceous material.

In other words, the carbonaceous material has a crystalline portion and a non-crystalline portion, and the G value can be said to be a parameter indicating the ratio of the crystalline portion of the carbonaceous structure.

Further, the carbonaceous material to be used for the electrode of the present invention desirably satisfies the following conditions.

That is, the two-fold distance $a_0 (= 2d_{110})$ of the spacing ($d_{110}$) of the (110) plane in the X-ray wide angle diffraction analysis is preferably 2.38 to 2.47 Å, more preferably 2.39 to 2.46 Å, and the size (La) of the crystallite in the a-axis direction is preferably 10 Å or more, more preferably 15 to 150 Å, particularly preferably 19 to 70 Å.

Further, the particles of the carbonaceous material have a volume average particle size of 300 μm or less, preferably 0.5 to 200 μm, more preferably 1 to 150 μm, particularly preferably 2 to 100 μm, most preferably 5 to 80 μm.

Further, the carbonaceous material has internally fine pores, and the total fine pore volume is preferably $1.5 \times 10^{-3}$ ml/g or more. More preferably, the total fine pore volume is $2.0 \times 10^{-3}$ ml/g or more, more preferably $3.0 \times 10^{-3}$ to $8 \times 10^{-2}$ ml/g, particularly preferably $4.0 \times 10^{-}$ to $3 \times 10^{-2}$ ml/g.

The total fine volume and the average fine pore size as described below are determined by measuring the amount of the gas adsorbed onto the sample under some equilibrium pressures or the amount of the gas released by use of the quantitative volume method, and determined from the amount of the gas adsorbed on the sample.

The total fine pore volume is determined from the total amount of the gas adsorbed at a relative pressure P/Po=0.995, supposing that the fine pores are filled with liquid nitrogen.

Here,
P: vapor pressure of adsorbed gas (mmHg) and
Po: saturated vapor pressure of adsorbed gas at cooling temperature (mmHg).

Further, from the nitrogen gas amount adsorbed ($V_{ads}$), the liquid nitrogen amount ($V_{liq}$) which fills the fine pores is calculated by use of the following formula (1) to determine the total fine pore volume:

$$V_{liq} = \frac{P_a V_{ads} V_m}{RT} \quad (1)$$

Here, Pa and T are atmospheric pressure (kgf/cm$^2$) and temperature (° K), R is the gas constant. $V_m$ is a molecular volume of the gas adsorbed (34.7 cm$^3$/mole for nitrogen).

The average fine pore radius ($\gamma_p$) is preferably 8 to 100 Å. More preferably, it is 10 to 80 Å, further preferably 12 to 60 Å, particularly preferably 14 to 40 Å.

The average fine pore radius ($\gamma_p$) is determined from the $V_{liq}$ determined from the formula (1) as mentioned above and the BET specific area: S by use of the following formula (2):

$$\gamma_p = \frac{2 V_{liq}}{S} \quad (2)$$

Here, the fine pore is supposed to be cylindrical.

The carbonaceous material as described above can be generally obtained by carbonization of an organic compound by heating and decomposing it at a temperature of 300° to 3000° C. under an inert gas stream.

Specific examples of the organic compound which is the starting source may include any desired organic polymeric compound including cellulose resins; phenol resins; acrylic resins such as polyacrylonitrile and poly-(α-halogenated acrylonitrile); halogenated vinyl resins such as polyvinyl chloride, polyvinylidene chloride and chlorinated polyvinyl chloride; polyamideimide resins; polyamide resins; conjugated resins such as polyacetylene and poly(p-phenylene): condensed cyclic hydrocarbon compounds comprising two or more monocyclic hydrocarbon compounds having 3 or more membered ring such as naphthalene, phenanthrene, anthracene, triphenylene, pyrene, chresene, naphthacene, picene, perylene, pentaphene and pentacene condensed mutually to each other, or derivatives of the above-mentioned compounds such as carboxylic acids, carboxylic acid anhydrides, carboxylic acid imides, various pitches composed mainly of mixtures of the above-mentioned respective compounds such as crude oil, ethylene heavy end pitch, asphalt, decomposed pitch and coal tar pitch: condensed heterocyclic compounds comprising 2 or more heteromonocyclic compounds having 3 or more membered ring such as indole, isoindole, quinoline, isoquinoline, quinoxaline, phthalazine, carbazole, acridine, phenazine, phenathridine bonded together to each other, or bonded to one or more monocyclic hydrocarbon compound having 3 or more membered ring, derivatives of the above-mentioned respective compounds such as carboxylic acids, carboxylic acid anhydrides, carboxylic acid imides; further benzene and derivatives thereof such as carboxylic acids, carboxylic acid anhydrides, carboxylic acid imides, namely 1,2,4,5-tetracarboxylic acid, dianhydride thereof, or diimide thereof.

Also, monocyclic aromatic hydrocarbons such as benzene, toluene and xylene, derivatives there of such as carboxylic acids and carboxylic acid imides, aliphatic saturated hydrocarbons such as propane and aliphatic unsaturated hydrocarbons such as butadiene may be used as a starting material.

Also, by use of a carbonaceous material such as carbon black as the starting source, this may be further heated to progress appropriately carbonization for use as the carbonaceous material of the electrode of the present invention.

The electrode of the present invention is an electrode in which lithium or an alkali metal composed mainly of lithium is doped, as the active substance, in a carrier composed of a mixture of the above carbonaceous material and a conductive polymer composition composed of a polymer and lithium or an alkali metal ion composed mainly of lithium.

The polymer having ion conductivity of lithium contained in the conductive polymer composition may include polymers in which ion conductivity of lithium ions at the room temperature (20° C.) is preferably $10^{-8}$ S/cm or higher, more preferably $10^{-6}$ S/cm or higher, further preferably $10^{-5}$ S/cm or higher, particularly preferably $10^{-4}$ S/cm or higher, most preferably $10^{-3}$ S/cm or higher. Also, the ion conductivity thereof at 40° C. is preferably $10^{-7}$ S/cm or higher, more preferably $10^{-6}$ S/cm or higher, further preferably $10^{-4}$ S/cm or higher, particularly preferably $10^{-3}$ S/cm or higher.

The polymer having such an ion conductivity is preferably an organic polymer and may also act as a binder of the electrode. As the basic constitution, there may be used a composite system in which (a) a polymer which acts as a matrix polymer and (b) an alkali metal salt. As the matrix polymer, there may be suitable to employ polymers containing monomers having a polar group containing at least one selected from O, S, P, N or a halogen as a constitutional unit, and may be mentioned polymers having polyalkylene chain such as polyethylene oxide, polypropylene oxide and ethylene oxide.propylene oxide copolymer, and polyepichlorohydrin, polyphosphazene and vinyl series polymers.

Also, when the vinyl series polymer is used as the matrix polymer of the (a), organic compounds having high dielectric property may be formulated into the above basic constitution.

Further, there may be employed a polymer gel electrolytic composition comprising the vinyl series polymer as the matrix polymer of (a), a lithium salt as the alkali metal salt of (b) and also (c) an organic solvent and (d) a sorbitol derivative.

As the polyethylene oxide, polypropylene oxide and ethylene oxide.propylene oxide copolymer to be used as the matrix polymer of (a), there may be mentioned, for example, a polyethylene oxide cross-linked material, a polypropylene oxide cross-linked material and an ethylene oxide.propylene oxide copolymer in which the following tri-functional compound of the formula (I) (exemplified by polyethyelene oxide)

$$\begin{array}{l} CH_2O(CH_2CH_2O)_xH \\ | \\ CHO(CH_2CH_2O)_xH \\ | \\ CH_2O(CH_2CH_2O)_xH \end{array} \quad (I)$$

wherein x represents an integer of 1 to 120, is crosslinked by a diisocyanato compound represented by the formula (II):

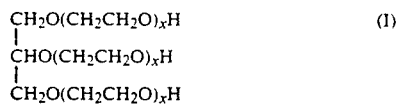

(II)

Also, a cross-linked material in which the above polymer is added to a polyglycerin as a side chain may be used.

As the polymer having a phosphazene structure, there may be exemplified by, for example, those having an oligooxyethylene chain at the side chain as shown by the formula (III):

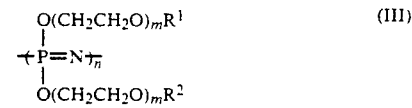

wherein $R^1$ and $R^2$ each represent an alkyl group having 1 to 6 carbon atoms, preferably an alkyl group having 1 to 4 carbon atoms, particularly preferably methyl group; n is an integer of 5 or more; and m is an integer of 1 to 100.

As the matrix polymer of the polymer composition, when the vinyl series polymer is used, those having a dielectric ratio of 4 or more, preferably 7 or more are preferably used.

When the polymer gel electrolytic composition is constituted, as polymeric vinyl monomers for obtaining the vinyl series polymer, there may be mentioned alkyl (meth)acrylates; unsaturated nitriles such as (meth)acrylonitrile; vinyl compounds such as vinyl acetate; N-vinyl lactams such as N-vinylpyrrolidone and N-vinylpiperidone; (meth)acrylic acid; hydroxyalkyl (meth)acrylates such as hydroxyethyl or hydroxypropyl ester of (meth)acrylic acid; (meth)acrylamide; glycerin mono(meth)acrylates; polyethylene glycol mono(meth)acrylates; polyethylene glycol di(meth)acrylates; alkoxypolyethyleneglycol mono(meth)acrylates and the like.

The matrix polymer of Component (a) can be obtained by polymerizing these polymeric vinyl monomers using a polymerization initiator.

In order to obtain high ion conductivity, the polymers may preferably be a polymer which is obtained by polymerizing (or copolymerizing) a monomer containing an alkylene oxide chain such as polyalkylene glycol (meth)acrylates, alkoxypolyalkylene glycol (meth)acrylates and siloxane-modified polyalkylene glycol (meth)acrylates.

As the alkali metal salts of (b) to be complexed in the polymer matrix as described above, there may be used at least one selected from, for example, $LiClO_4$, $LiBF_4$, $LiPF_6$, $LiAsF_6$, $LiCF_3SO_3$, $KPF_6$, $KCNS$ and $NaPF_6$ When the vinyl series polymer such as polyvinylidene fluoride or polyacrylonitrile is used as Component (a), an organic compound with high dielectric constant may be used in combination with Component (b). Such an organic compound may include ethylene carbonate, propylene carbonate and γ-butyrolactone.

An amount of an alkali metal salt to be complexed (and an amount of an organic compound with high dielectric constant to be further formulated) may vary depending on the kind of the matrix polymer (a) to be used and the kind of the system.

In general, the amount of the alkali metal salt is preferably 0.01 to 2.0 mole, more preferably 0.02 to 0.60 mole, further preferably 0.03 to 0.50 mole, particularly preferably 0.04 to 0.30 mole based on one unit of the recurring unit of the polymer.

When vinyl series polymers such as polyvinylidene fluoride and polyacrylonitrile are used as the matrix polymer, in the binary system, the amount of the alkali metal salt is preferably 0.01 to 1.0 mole, more preferably 0.02 to 0.60 mole, further preferably 0.03 to 0.50 mole, particularly preferably 0.04 to 0.30 mole based on one unit of the recurring unit of the polymer.

In case of the ternary system, the amount of the alkali metal salt is preferably 0.01 to 1.0 mole, more preferably 0.05 to 0.90 mole, further preferably 0.1 to 0.8 mole, particularly preferably 0.2 to 0.7 mole based on one unit of the recurring unit of the polymer, and that of the organic compound with high dielectric constant is also preferably 0.1 to 1.5 mole, more preferably 0.2 to 1.3 mole, further preferably 0.3 to 1.0 mole based on the same.

Composition of the matrix polymer (a) and the alkali metal salt may be carried out by the method in which after dissolving both of the components in a common solvent and then removing the solvent according to the usual manner. In the case of using it as a polymer gel electrolytic composition, it can be used as such without removing the solvent.

The organic solvent of Component (c) of the polymer gel electrolytic composition forms an electrolyte with the alkali metal salt (b). Such an organic solvent may be mentioned amide type solvents such as N-methylformamide, N,N'-dimethylformamide and N-methylpyrolidinone; carbamate type solvents such as N-methyloxazolidinone; urea type solvents such as N,N'-dimethylimidazolidinone; lactone type solvents such as γ-butyrolactone and γ-valerolactone; carbonate type solvents such as ethylene carbonate, propylene carbonate and butylene carbonate; alcohol type solvents such as ethylene glycol and ethylene glycol monomethyl ether; sulforan type solvents such as sulforan and 3-methylsulforan; nitrile type solvents such as acetonitrile and 3-methoxypropionitrile; phosphate type solvents such as trimethylphosphate; ether type solvents such as 1,2-dimethoxyethane, tetrahydrofuran and 1,3-dioxorane; and hydrocarbon type solvents such as hexane, benzene and toluene, and they may be used alone or in combination. Among these, particularly preferred are nonionic organic solvents with high dielectric constant such as ethylene carbonate, propylene carbonate, γ-butyrolactone, sulforan, 3-methylsulforan and 1,2-dimethoxyethane since high ion conductivity can be obtained.

In the electrolytic composition, the sorbitol derivatives which are used as Component (d) are 1,3,2,4-dibenzylidene sorbitol derivatives having at least one —COOR (where R represents a hydrocarbon group having 1 to 20 carbon atoms) as a nucleic substituent. The derivatives can be obtained, for example, by effecting dehydration condensation reaction of D-sorbitol and benzaldehydes in the presence of an acid catalyst. The benzaldehydes are reacted with 2 moles per one mole of the sorbitol, but at this time at least one mole of the benzaldehydes is benzaldehydes having at least one —COOR substituent as a nucleic substituent such as p-formylbenzoate.

The substituted position of the —COOR group on the benzene ring may be any of ortho-, meta- or para-position, but that of para-position is preferred since it can be easily obtainable.

The residue R of the ester group is a hydrocarbon group having 1 to 20 carbon atoms as mentioned above, and may be any of an alkyl group, an aryl group or an aralkyl group, but preferably a lower alkyl group.

For obtaining high ion conductivity of the polymer gel electrolyte composition and obtaining the solid electrolyte with excellent mechanical strength (flexibility) and heat resistance, a ratio of the polymeric vinyl monomer for obtaining Component (a) is preferably 3 to 70% by weight, more preferably 5 to 50% by weight, particularly preferably 10 to 30% by weight based on the electrolyte comprising Component (b) and Component (c).

A ratio of an electrolyte salt compound of Component (b) to be used in the above electrolyte is preferably 5 to 30% by weight, preferably 10 to 25% by weight based on the organic solvent of Component (c) to prepare the electrolyte.

A ratio of the sorbitol derivative of Component (d) is preferably 0.5 to 10% by weight, more preferably 1 to 5% by weight based on the above electrolyte to prepare the same.

As a preparation method of the polymer gel electrolyte composition, there may be mentioned the method in which the polymeric vinyl monomer(s) is/are polymerized in the presence of an electrolyte and the sorbitol compound to prepare a solid state electrolyte composition.

That is, the sorbitol derivative is added to the electrolyte, the polymeric vinyl monomer is added to the uniform solution dissolved by heating, and the uniform solution to which a radical polymerization initiator such as a peroxide or an azo compound or a photo(UV)-polymerization initiator is added as a polymerization initiator is molded into a film state material by the flow casting or the cast molding, and then polymerization is effected under heating at 60° to 90° C. or under irradiation of light (UV) to obtain a thin film of a solid state electrolyte composition.

As the other preparation method, there is the method in which a polymeric vinyl monomer(s) is/are previously polymerized to synthesize a matrix polymer and then an electrolyte and a sorbitol compound are added into the polymer and mixed. More specifically, a polymeric vinyl monomer(s) is/are dissolved in a solvent, an usual radical polymerization initiator is added thereto and under inert atmosphere, the mixture is stirred at 40° to 80° C. under heating for 4 to 16 hours to synthesize a matrix polymer and after molding to a film state material, the film state material is dipped in an electrolyte in which a sorbitol compound is dissolved by heating to prepare a thin film of a polymer gel electrolyte composition.

The electrode of the present invention has a carrier composed of a mixture comprising the above carbonaceous material and the above polymer composition of lithium or an alkali metal ion composed mainly of lithium and having conductivity. A ratio of the carbonaceous material in the mixture is preferably 30 to 98% by weight, more preferably 40 to 97% by weight, further preferably 50 to 95% by weight, particularly preferably 60 to 93% by weight.

A ratio of the polymer composition of lithium or an alkali metal ion composed mainly of lithium and having conductivity in the mixture is preferably 2 to 70% by weight, more preferably 3 to 60% by weight, more preferably 5 to 50% by weight, particularly preferably 7 to 40% by weight.

The mixture constituting the carrier may contain, except for the above carbonaceous material and the conductive polymer composition of lithium or an alkali metal ion composed mainly of lithium, other materials such as a metal capable of forming an alloy with lithium, including, for example, aluminum, or an alloy of lithium with an amount of 70% by weight or less, preferably not more than 50% by weight, more preferably 10 to 45% by weight.

The mixture comprising the above carbonaceous material and the above conductive polymer composition of lithium or an alkali metal ion composed mainly of lithium can be prepared as shown below and used as an electrode.

For example, a matrix polymer such as a polyethylene oxide, polypropylene oxide, polyepichlorohydrine, polyphosphazene, polyvinylidene fluoride and polyacrylonitrile, and an alkali metal salt are dissolved in a solvent and particles of the above carbonaceous material are added thereto to prepare a paste-state material. Then, this is coated on a collector of wire mesh made of a metal such as copper or nickel, or a sheet (foil) made of a metal of the same as above and dried to form an electrode composed of a mixture of the carbonaceous material and the conductive polymer composition composed of lithium or an alkali metal ion composed mainly of lithium.

It is also possible to prepare an electrode by further adding an organic compound with high dielectric constant to a complex system of the high dielectric constant polymer such as polyvinylidene fluoride or polyacrylonitrile and the alkali metal salt to dissolve in the organic solvent, and adding particles of the above carbonaceous material to make a paste-state material, followed by the same manner as mentioned above.

Or else, particles of the above carbonaceous material are added to the complex system of the poly-functional polyethylene oxide, alkali metal salt and cross-linking agent to prepare a paste-state material, and then coating the material on a collector such as a sheet (foil) made of a metal or wire mesh made of a metal and dried as mentioned above to form an electrode composed of a mixture of the carbonaceous material as mentioned above and the polymer composition composed of a complex system of cross-linked polyethylene oxide and the alkali metal salt.

Or else, the above polymeric vinyl monomer, the electrolyte, the sorbitol compound and particles of the carbonaceous material are mixed to prepare a paste material, and the material is coated on wire mesh made of a metal or a sheet (foil) made of a metal and then polymerized to form an electrode composed of a mixture of the above carbonaceous material and the polymer gel electrolyte composition.

In either of means, the mixture of the carbonaceous material and the ion conductive polymer composition comprising lithium or alkali metal mainly composed of lithium is used as an electrode by formulating into a sheet or pellets, or molding into a sheet or pellets.

As the preferred complex mode of the mixture of the carbonaceous material and the ion conductive polymer composition comprising lithium or alkali metal mainly composed of lithium, the following mode may be mentioned.

That is, preferred is the mode wherein part or all of the surfaces of the particles of the carbonaceous material is coated by the the ion conductive polymer composition comprising lithium or alkali metal mainly composed of lithium and particles of said carbonaceous material are combined with each other. In such a complex mode, the state of the electrode can be retained.

As the method of carrying the active substance, there are the chemical method, the electrochemical method and the physical method. For example, it is possible to apply the method in which the carrier is dipped in an electrolyte containing lithium ions or alkali metal ions of predetermined concentrations, and lithium is used as an opposite electrode to carry out electrolytic impregnation with the carrier as the anode, the method in which lithium powder is mixed in the process of obtaining a molded product of the carrier, the method in which lithium metal is dissolved in a solvent and the above carbonaceous material is dipped therein to effect reaction therebetween, the method in which the above carbonaceous material is contacted with an organo lithium or lithium iodide to effect reaction therebetween, or the method in which the above carbonaceous material is contacted with melted lithium metal. Also, it may be also possible to previously carry the active substance such as an alkali metal, preferably lithium by bringing an alkali metal, preferably lithium electrically contact with the carrier comprising the carbonaceous material synthesized as mentioned above and the polymer composition having ion conductivity comprising lithium or alkali metal mainly composed of lithium.

The above reaction may be carried out in the temperature range of 0° C. to less than the temperature at which the alkali metal is melted, preferably 20° to 80° C. The higher the temperature becomes, the higher the ion conductivity of the polymer composition is, so that the reaction rate of the carrying reaction becomes rapid.

These reactions are preferably carried out at a dew point of $-20°$ C. or lower, preferably $-30°$ C. or lower in a dried air or an inert gas such as an argon gas.

The carrier comprising the above carboneceous material and the polymer composition having ion conductivity and composed of lithium or an alikali metal ion mainly composed of lithium is made an electrode at one side and the alkali metal is made the opposed electrode, whereby doping and carrying of the alkali metal to the carbonaceous material can be carried out by external short circuit.

Or else, by applying an electric field from outward to compulsory flowing a current between both electrodes, the alkali metal, preferably lithium can be doped or carried onto the carbonaceous material from the alkali metal electrode.

An amount of lithium thus previously carried on the negative electrode carrier may be preferably 0.030 to 0.250 part by weight, more preferably 0.060 to 0.200 part by weight, further preferably 0.025 to 0.15 part by weight, particularly preferably 0.030 to 0.12 part by weight, further preferably 0.070 to 0.150 part by weight, particularly preferably 0.075 to 0.120 part by weight, most preferably 0.080 to 0.100 part by weight, per 1 parts by weight of the carrier.

The electrode for secondary battery of the present invention is generally used as the negative electrode and opposed to a positive electrode through an intermediary separator.

The electrode for secondary battery of the present invention can be applied as the electrode for various batteries of sheet shape, square shape and cylindrical shape.

For example, as shown in FIG. 1, the positive electrode body 1 and the negative electrode body 2 of the present invention can be rolled in shape of coil in the form opposed to each other with an intermediary separator 3, which are housed in a cylindrical vessel to form a cylindrical secondary battery.

The material of the above positive electrode is not particularly limited, but, for example, it is preferred to compose of a metal chalcogen compound which release or obtain an alkali metal cation such as Li ion, etc. accompanied by the charge-discharge reaction. As such a metal chalcogen compound, there may be mentioned an oxide of vanadium, a sulfide of vanadium, an oxide of molybdenum, a sulfide of molybdenum, an oxide of manganese, an oxide of chromium, an oxide of titanium, a sulfide of titanium, a complexed material of the above oxide and a complexed material of the above sulfides. Preferably used are $Cr_3O_8$, $V_2O_5$, $V_6O_{13}$, $VO_2$, $Cr_2O_5$, $MnO_2$, $TiO_2$, $MoV_2O_8$, $TiS_2$, $V_2S_5$, $MoS_2$ $MoS_3$, $VS_2$, $Cr_{0.25}V_{0.75}S_2$ and $Cr_{0.5}V_{0.5}S_2$. Also, there may be used an oxide such as $LiCoO_2$ and $WO_3$; a sulfide such as CuS, $Fe_{0.25}V_{0.75}S_2$ and $Na_{0.1}CrS_2$; a phosphor and sulfur-containing compound such as $NiPS_3$ and $FePS_3$; and a selenium compound such as $VSe_2$ and $NbSe_3$.

Also, an electroconductive polymer such as polyaniline and polypyrrole can be used.

The separator for holding the electrolyte is formed by use of a material excellent in liquid holding characteristic such as nonwoven fabric of polyolefin resin. The separator is impregnated with a non-aqueous electrolytic solution comprising an electrolyte such as $LiClO_4$, $LiBF_4$, $LiAsF_6$ and LiPF6 dissolved at a predetermined concentration in an aprotic organic solvent such as propylene carbonate, 1,3-dioxorane and 1,2-dimethoxyethane.

It is also possible to have a solid electrolyte which is a conductor for lithium or alkali metal ions interposed between the positive electrode body and the negative electrode body.

In the secondary battery thus constituted, at the negative electrode, active substance ions are carried onto the carrier during charging, and the active substance ions in the carrier are released during discharging, whereby the electrode reaction of charging and discharging proceeds.

When an electroconductive polymer such as polyaniline is employed as the positive electrode, counter ions of the active substance ions are carried on the positive electrode body during charging, and the counter ions of the active substance ions released from the positive electrode body during discharging, whereby the electrolysis reaction proceeds.

As described above, the battery reaction accompanied with charging and discharging proceeds according to the combination of the electrode reaction of the positive electrode body and the negative electrode body.

The electrode for secondary battery of the present invention comprises an alkali metal composed mainly of lithium carried on a carrier comprising a mixture of the particles of the carbonaceous material as described above and the ion conductive polymer composition composed of lithium or an alkali metal mainly composed of lithium, which can be formed into a shape of flexible sheet-shaped electrode, and this can be applied in a coil shape to a cylindrical secondary battery, and also as the electrode for thin sheet-shaped battery and square battery, thereby providing an electrode enabling secondary battery having high capacity, high output and excellent charging and discharging characteristic.

Also, since the polymer composition having ion conductivity of lithium is used as a binder, doping and dedoping to the carrier of the alkali metal can be smoothly effected and it is advantageous as an electrode.

The electrode for the secondary battery of the present invention is well balanced in electrode capacity and charging-discharging cycle characteristics, and a necessary alkali metal, preferably lithium can be previously and effectively carried on the electrode before assembling the battery so that it is industrially advantageous.

EXAMPLES

In the following, the present invention will be described by referring to Examples and Comparative examples. The present invention is not limited by the examples.

In the present invention, the respective measurements of elemental analysis and X-ray wide angle diffraction were practiced according to the following methods.

Elemental Analysis

A sample was dried under reduced pressure at 120° C. for about 15 hours, then dried by placing on a hot plate in a dry box at 100° C. for 1 hour. Subsequently, the dried sample was sampled in an aluminum cup in an argon atmosphere, and the carbon content was determined from the weight of the $CO_2$ gas generated by combustion, and the hydrogen content from the weight of the $H_2O$ generated. In Examples of the present invention as described below, measurement was conducted by use of Perkin Elmer 240 C Model Elemental Analyzer.

X-ray Wide Angle Diffraction (1) Spacing ($d_{002}$) of the (002) plane and spacing ($d_{110}$) of the (110) plane As such, when the carbonaceous material is powder, or powdered by an agate mortar when it is fine flake, high purity silicon powder for X-ray standard is mixed as internal standard substance in an amount of about 15% by weight based on the sample, filled in a sample cell, and the wide angle X-ray diffraction curve is measured by the reflection system diffractometer method with the CuKα line monochromated by a graphite monochromator as the line source. For correction of the curve, none of the corrections concerned with the so-called Rorentz, polarizing light factor, absorption factor and atomic scattering factor were done, but the following simplified method was employed. That is, by drawing the baselines for the curve corresponding to (002) and (110) diffractions are drawn, the substantive intensity from the baseline is plotted again to obtain the corrected curves of the (002) plane and the (110) plane. The middle point of the segment of the line in parallel to the angle axis drawn at ⅔ of the peak height of the curve crossing the diffraction curve was determined, the angle of the middle point corrected with the internal standard, which was made 2-fold of the diffraction angle, and $d_{002}$ and $d_{110}$ were determined from the wavelength λ of the CuKα line according to the Bragg's formula shown below.

$$d_{002} = \frac{\lambda}{2\sin\theta} \text{ [Å]}; \quad d_{110} = \frac{\lambda}{2\sin\theta'} \text{ [Å]}$$

λ:1.5418 Å
θ and θ': diffraction angles corresponding to $d_{002}$ and $d_{110}$.

(2) Sizes of Crystallines in the C-Axis and A-Axis Directions: Lc; La

In the corrected diffraction curves obtained in the previous item, by use of the so-called half-value width β at the position of half of the peak height, the sizes of the crystallines in the c-axis and the a-axis were determined from the following formulae:

$$Lc = \frac{K \cdot \lambda}{\beta \cdot \cos\theta} \text{ [Å]}.$$

$$La = \frac{K \cdot \lambda}{\beta \cdot \cos\theta'} \text{ [Å]}.$$

For the shape factor K, 0.90 was employed. $\lambda$, $\theta$ and $\theta'$ have the same meanings as in the previous item.

EXAMPLE 1 (1) Preparation of Carbonaceous Material

Granules of a crystalline cellulose (average radius: about 1 mm) were set in an electrical heating furnace, elevated up to a temperature of 1000° C. at an elevation rate of 250° C./hour under nitrogen gas stream, and further maintained at 1000° C. for one hour.

Then, after left to cool, the resulting particles of the carbonaceous material were set in a separate electrical furnace, elevated up to 1800° C. at an elevation rate of 1000° C./hour under nitrogen gas stream, and further maintained at 1800° C. for one hour.

The carbonaceous material thus obtained was placed in an agate mortar of 500 ml, 2 balls made of an agate of 30 mm in diameter, 6 balls of an agate of 25 mm in diameter and 16 balls of an agate of 20 mm in diameter were placed therein, followed by pulverization for 10 minutes.

The carbonaceous material obtained has the characteristics shown below as the result of analysis of elemental analysis and X-ray wide angle diffraction, and measurements of particle size distribution and specific surface area.

Hydrogen/carbon (atomic ratio)=0.04
$d_{002}$=3.59 Å, Lc=14 Å, $a_0$ (2 $d_{110}$)=2.41 Å,
La=25 Å, Volume average particle size=14.9 $\mu$m.
Specific surface area (BET)=19.3 m$_2$/g.

(2) Preparation of
1,3-(p-methoxycarbonylbenzylidene)-2,4-benzylidene sorbitol

In 200 ml of a flask were charged 36.4 g (0.2 mole) of D-sorbitol, 24 ml of water, 21.2 g (0.2 mole) of benzaldehyde and 2.3 g (0.012 mole) of p-toluene sulfonate monohydrate and the mixture was stirred at 35° C. for 6 hours under nitrogen atmosphere. After cooling to 20° C., 100 ml of water and 0.5 g of sodium hydroxide were added to the white creamy reaction mixture and the mixture was stirred at room temperature. This white slurry was filtered and the resulting white solid was thoroughly washed with water and diethyl ether, and dried to obtain 46.4 g of white powder of 2,4-benzylidene sorbitol (Yield: 85.9%).

Subsequently, into a 2 liter flask equipped with a Dean-Stark type fractionating tube and a potent stirrer were charged 46.4 g (0.17 mole) of 2,4-benzylidene sorbitol, 27.9 g (0.17 mole) of methyl p-formylbenzoate, 800 ml of benzene and 0.32 g (1.7 mmole) of p-toluene sulfonic acid monohydrate, and under nitrogen atmosphere, the mixture was stirred at the reflux temperature of benzene (77° C.) for 6 hours. During the reaction, water distilled in the fractionating tube was drawn off depending on necessity. After cooling to the room temperature after completion of the reaction, 300 ml of water and 70 mg of sodium hydroxide were added to the white gel reaction mixture and the mixture was stirred at room temperature. This white slurry was filtered and the resulting white solid was thoroughly washed with a hot water at about 70° C. and ethanol, and dried to obtain 65.8 g of the desired white powder of 1,3- (p-methoxycarbonylbenzylidene)-2,4-benzylidenesorbitol (Yield: 92.0%, Total yield from D-sorbitol: 79.0%).

(3) Preparation of Carrier Composed of Carbonaceous Material and Polymer Gel Electrolyte Composition In an electrolyte in which 0.6 g (12% by weight) of lithium perchlorate was dissolved in 3.03 g of $\gamma$-butyrolactone (as a compositional weight ratio to the polymer gel electrolyte: 60.5% by weight) was added and mixed 0.075 g (1.5% by weight) of the above sorbitol compound and the mixture was completely dissolved at 70° C. for 3 hours to obtain a solution. Subsequently, 1.3 g of methoxypolyethylene glycol (polymerization degree: about 23) methacrylate was added in said solution as a polymeric vinyl monomer and mixed, and 4 mg of perbutyl 0 (trade name, t- butylperoxy-2-ethylhexanoate, produced by Nippon Oil & Fats Co.) was added as a polymerization initiator to obtain a uniform solution.

To the solution was added 12 g of particles of the carbonaceous material synthesized in the above (1) and mixed to obtain a paste state material.

This was coated on the both sides of a copper foil with a thickness of 10 $\mu$m and polymerization was carried out at 80° C. for 16 hours under argon atmosphere.

Thus, a carrier sheet with a thickness of 210 $\mu$m and comprising the carbonaceous material and the polymer gel electrolyte composition was prepared.

When a sheet composed only of the above polymer gel electrolyte composition was prepared and its ion conductivity was measured to give the result of $1.6 \times 10^{-3}$ S/cm.

The ion conductivity was measured as shown below. That is, after measuring the thickness of the film state material of the polymer gel electrolyte composition which is a sample with a micrometer, gold-plated electrodes which were circular shaped with a diameter of 6 mm were adhered to both surfaces of the solid state electrolyte, and the whole material was placed in a nitrogen atmosphere controlled at a temperature of 25° C., an alternating current of $10^2$ to $10^6$ Hz was applied thereto by LCR meter (manufactured by Yokogawa Hulet Packard Co., 4274 A, 4275 A) to measure ion conductivity according to the complex impedance method.

(4) Carrying Lithium on Carrier Material

Using the above carrier material as one electrode and lithium metal as an opposite electrode, electrolysis treatment was carried out in a propylene carbonate solution containing 1 mole/liter of LiClO$_4$ to obtain a negative electrode body by carrying lithium which is an active substance. Conditions of the electrolysis were the bath temperature of 20° C., current density of 0.5 mA/cm$^2$ and electrolysis time of 15 hours whereby lithium corresponding to 200 mAh/g was carried on the negative electrode body.

(5) Preparation of Positive Electrode 100 parts by weight of amorphous V$_2$O$_5$ powder and 10 parts by weight of powdery polytetrafluoroethylene were kneaded and the resulting kneaded product was subjected to roll molding to form a sheet having a thickness of 120 $\mu$m.

(6) Assembly of Battery

A sheet-shaped electrode carried lithium on the carrier material comprising a mixture of the carbonaceous material and the polymer gel electrolyte composition was used as a negative electrode according to the above (4) and after a polypropylenic nonwoven fabric was mounted as the separator, or, a sheet-shaped electrode comprising the above $V_2O_5$ was laminated as a positive electrode. This laminate was mounted in a cylindrical can made of stainless with a shape of spiral by rolling up it as shown in FIG. 1.

By impregnating a propylene carbonate solution containing 1 mole/liter of $LiClO_4$ to the separator, and sealing the battery cell to assemble a battery cell shown in FIG. 1.

(7) Characteristics of the Battery

With respect to the battery thus prepared, discharging was carried out with a constant current of 15 mA until the battery voltage became 1.5 V. Thereafter, charging was carried out with a constant current of 15 mA until the battery voltage became 3.3 V, and then preliminary charging and discharging was practiced for 5 cycles with voltage regulations of 3.3 V upper limit and 1.8 V lower limit and the constant current of 15 mA.

Thereafter, charging and discharging were repeated between 3.3 V and 1.8 V with a constant current of 15 mA to carry out cycle evaluation. Characteristics at 6 cycles and at 50 cycles are shown in Table 1.

EXAMPLE 2

To 1,2-dimethoxyethane were added 92.5 parts by weight of polyphosphazene comprising the recurring unit represented by the formula (IV) and 7.5 parts by weight of LiC104, and the mixture was stirred to obtain a uniform solution.

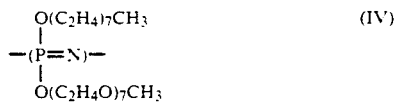

(IV)

To the solution was added 90 parts by weight of particles of the carbonaceous material used in Example 1 based on 10 parts by weight of the polyphosphazene to prepare a paste state material.

This paste was coated on the both surfaces of a copper foil with a thickness of 10 μm and dried in the same manner as in Example 1.

The ion conductivity of the above polyphosphazene/$LiClO_4$ polymer composition was $2.0 \times 10^{-4}$ S/cm at room temperature (20° C.).

Onto the aforesaid carrier material was adhered by pressure 10 mg of a lithium metal foil with a thickness of 50 μm, the material was allowed to stand at 40° C. for one hour under argon gas atmosphere to carry lithium to the carbonaceous material.

To the carrier material comprising a mixture of the carbonaceous material and polyphosphazene/$LiClO_4$ composition having lithium ion conductivity thus obtained, a sheet-shaped electrode to which lithium is carried is used as a negative electrode and the above $V_2O_5$ sheet electrode prepared by the same method as in Example 1 as a positive electrode, a battery was assembled as in Example 1.

Characteristics of the battery were measured in the same manner as in Example 1. The results are shown in Table 1.

Comparative Example 1

Into toluene was dissolved a styrene-ethylene-butylene-styrene block copolymer (styrene content: 28% by weight), and to the solution was added 90 parts by weight of particles of the carbonaceous material synthesized according to the same manner as in Example 1 based on 10 parts by weight of the block copolymer to prepare a paste state material. The block copolymer had no ion conductivity of lithium.

This paste was coated on both surfaces of a copper foil with a thickness of 10 μm, and dried to form a carrier material sheet with a thickness of 200 μm.

To the above carrier was adhered by pressure 110 mg of a lithium metal foil with a thickness of 50 μm and the material was allowed to stand in an argon gas for 2 weeks, lithium was not carried on the carbonaceous material.

Thus, by using the electrode in which the lithium metal foil was adhered to the carrier material as a negative electrode and using a $V_2O_5$ sheet electrode prepared in the same manner as in Example 1 as a positive electrode, a battery was assembled in the same manner as in Example 1.

With respect to the battery, electrode characteristics were evaluated in the same manner as in Example 1. The results are shown in Table 1.

At the 50th cycle, the batteries of Examples 1 and 2 are normally worked and their coulomb efficiencies are substantially not changed as compared with those of the 6th cycle. To the contrary, the battery of Comparative example was impossible in charging-discharging at the 50th cycle. This is because lithium of a metal foil is transferred to the positive or negative electrode in accordance with charging-discharging reaction to be carried thereon whereby the thickness of the lithium metal foil becomes thin to cause voids or pore so that internal resistance of the battery extremely increased to cause lowering in battery capacity.

TABLE 1

| | 6 cycles | | | 50 cycles | | |
|---|---|---|---|---|---|---|
| | Charged capacity (mAh) | Discharged capacity (mAh) | Coulomb efficiency (%) | Charged capacity (mAh) | Discharged capacity (mAh) | Coulomb efficiency (%) |
| Example 1 | 320 | 317 | 98.8 | 321 | 318 | 99.0 |
| Example 2 | 310 | 307 | 99.0 | 311 | 308 | 99.1 |
| Comparative example 1 | 150 | 61.5 | 41.0 | — | — | — |

We claim:

1. An electrode for a secondary battery, comprising: a carrier doped with lithium or lithium containing another alkali metal as the active substance, said carrier composed of a mixture of (i) from 30 to 98% by weight of a carbonaceous material having a hydrogen/carbon (H/C) atomic ratio of less than 0.15, a spacing ($d_{002}$) of the (002) plane as determined by X-ray wide angle diffraction of 3.37 to 3.75 Å, a total fine pore volume of $1.5 \times 10^{-3}$ ml/g or more and a crystallite size in the c-axis direction (Lc) of 5 Å or more, and (ii) from 2 to 70% by weight of a conductive polymer composition composed of lithium ion or lithium containing another alkali metal and an ion conducting polymer selected from the group consisting of (A) a polymer gel electrolytic composition comprising (a) a vinyl series polymer, as a matrix polymer which is obtained by polymerizing a monomer selected from the group consisting of alkyl(meth)acrylates, (meth)acrylonitrile, vinyl acetate, N-vinyl lactams, (meth)acrylic acid, hydroxyalkyl(meth)acrylates, (meth)acrylamide, glycerin mono(meth)acrylate, polyalkylene glycol(meth)acrylates, alkoxypolyalkylene glycol mono(meth)acrylates and siloxane-modified polyalkylene glycol(meth)acrylates, (b) an orangic solvent, and (c) 1,3,2,4-dibenzylidene sorbitol derivatives having at least one -COOR group, wherein R represents a hydrocarbon group having 1 to 20 carbon atoms, and (B) a polymer composition comprising polyphosphazene represented by the formula:

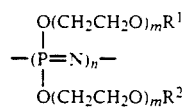

wherein $R^1$ and $R^2$ each represent an alkyl group having 1 to 6 carbon atoms, n is an integer of 5 or more and m is an integer of 1 to 100, said polymer composition having an ion conductivity at 20° C. or $10^{-8}$ S/cm or greater.

2. The electrode according to claim 1, wherein the carbonaceous material is a particulate material whose particles have a volume average particle size of 0.5 to 300 μm.

3. The electrode according to claim 2, wherein the carbonaceous material has internal fine pores having a total pore volume of $3.0 \times 10^{-3}$ ml/g to $8 \times 10^{-2}$ ml/g.

4. The electrode according to claim 1, wherein said conductive polymer composition exhibits a lithium ion or alkali metal salt conductivity at 20° C. of $10^{-6}$ S/cm or higher.

5. The electrode according to claim 3, wherein the carbonaceous material has an average fine pore radius of 8 to 100 Å.

6. The electrode according to claim 1, wherein the polymer of the vinyl series has a dielectric ratio of 4 or more.

7. The electrode according to claim 1, wherein the vinyl polymer is a polyacrylonitrile containing an organic compound having a high dielectric ration.

8. The electrode according to claim 1, wherein the total alkali metal content in the conductive polymer composition is 0.01 to 2.0 mole to one unit of the recurring unit of the polymer.

9. The electrode according to claim 1, wherein the monomer of the vinyl series is a (meth)acrylate, vinyl acetate, N-vinyllactam, methacrylamide or glycerin mono(meth)acrylate monomer.

10. The electrode according to claim 1, wherein the Li dopant is a salt selected from the group consisting of $LiClO_4$, $LiBF_4$, $LiPF_6$, $LiAsF_6$ and $LiCF_3SO_3$.

11. The electrode according to claim 1, wherein the amount of carbonaceous material in the carrier ranges from 40 to 97% by weight, while the amount of conductive polymer composition in the carrier ranges from 3 to 60% by weight.

12. The electrode according to claim 1, wherein the amount of carbonaceous material in the carrier ranges from 50 to 95% by weight, while the amount of conductive polymer composition ranges from 5 to 50% by weight.

* * * * *